United States Patent [19]

Fredriksson

[11] 4,062,088
[45] Dec. 13, 1977

[54] SHEARS COUPLING

[75] Inventor: Lars Olof Arne Fredriksson, Vaxjo, Sweden

[73] Assignee: K A Bergs Smide AB, Gelma, Sweden

[21] Appl. No.: 750,871

[22] Filed: Dec. 15, 1976

Related U.S. Application Data

[63] Continuation of Ser. No. 651,960, Jan. 23, 1976, abandoned.

[51] Int. Cl.$^2$ ............................................. A44B 21/00
[52] U.S. Cl. .................................................. 24/73 HR
[58] Field of Search .............. 24/73 HR, 81, 241 PC, 24/248, 230, 5.55, 242, 73 HH, 241 TC, 241 SC, 241 CA, 232; 294/82

[56] References Cited

U.S. PATENT DOCUMENTS

| 850,623 | 4/1907 | Clark | 24/241 SC |
| 1,749,096 | 3/1930 | Baxter | 24/242 |

Primary Examiner—Werner H. Schroeder
Assistant Examiner—Doris L. Troutman
Attorney, Agent, or Firm—Hubbel, Cohen, Stiefel & Gross

[57] ABSTRACT

A shears coupling, particularly for interconnecting two load supporting members, such as a looped cable and a chain, by the aid of a mating coupling member, comprises a pair of two-armed levers which are rotatably interconnected by means of a common pivot. Each lever has an arcuate shank, which is located substantially in the same plane as said common pivot and has a free end which, when the shears coupling is in its closed operative position, overlaps the free end of the other arcuate shank for forming a substantially closed eye. The other arm of each lever has at least one lug, which projects, preferably radially, with respect to the pivot and is provided with a through opening, which substantially registers with the respective openings of the other lugs in said closed position. The levers are locked in the closed position of the shanks by means of a pin or bolt which is introduced through said openings and interconnects the shears coupling with the mating coupling member, which has a number of similar apertured lugs which have been interlaminated with the lugs of the shears coupling, by passing through all said openings.

8 Claims, 14 Drawing Figures

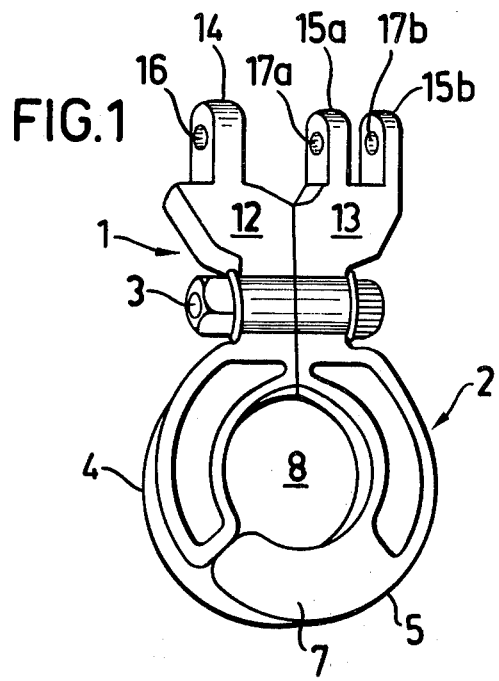
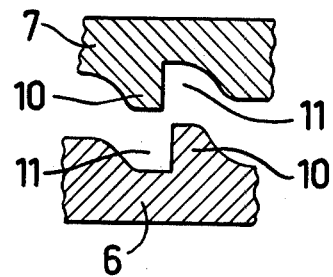
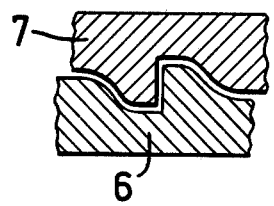
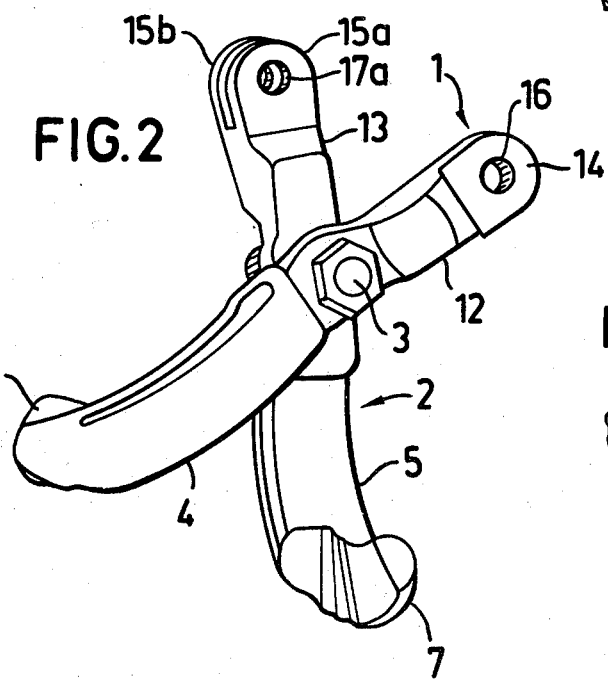
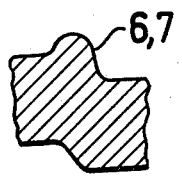

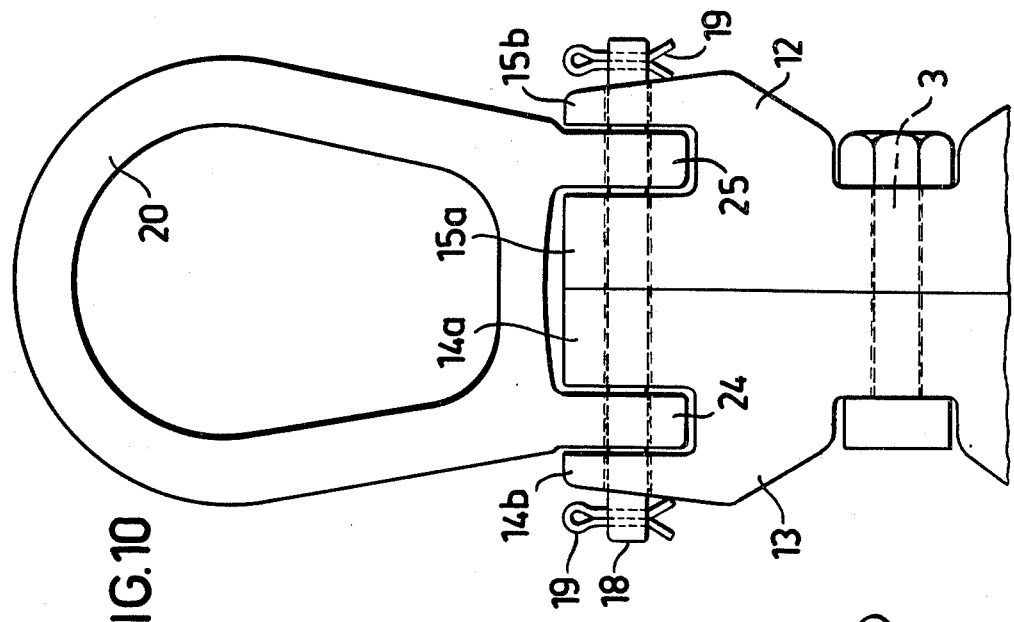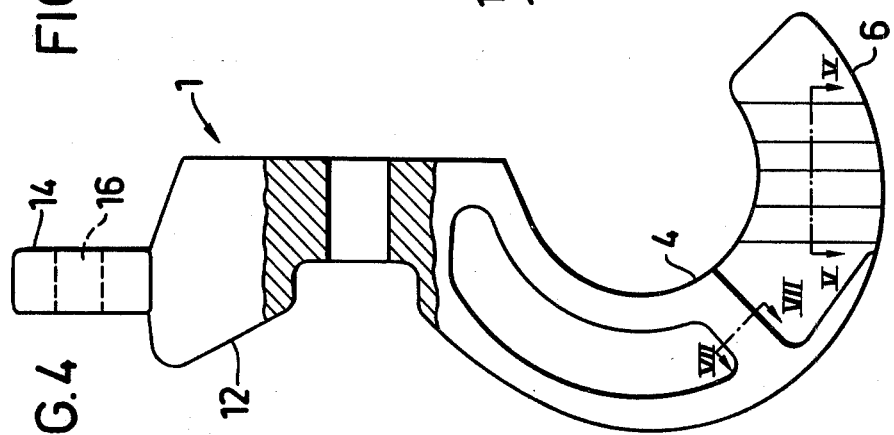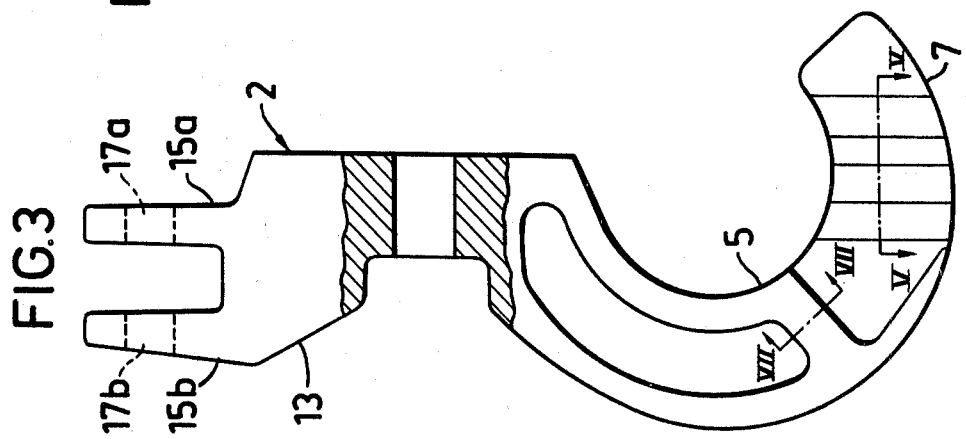

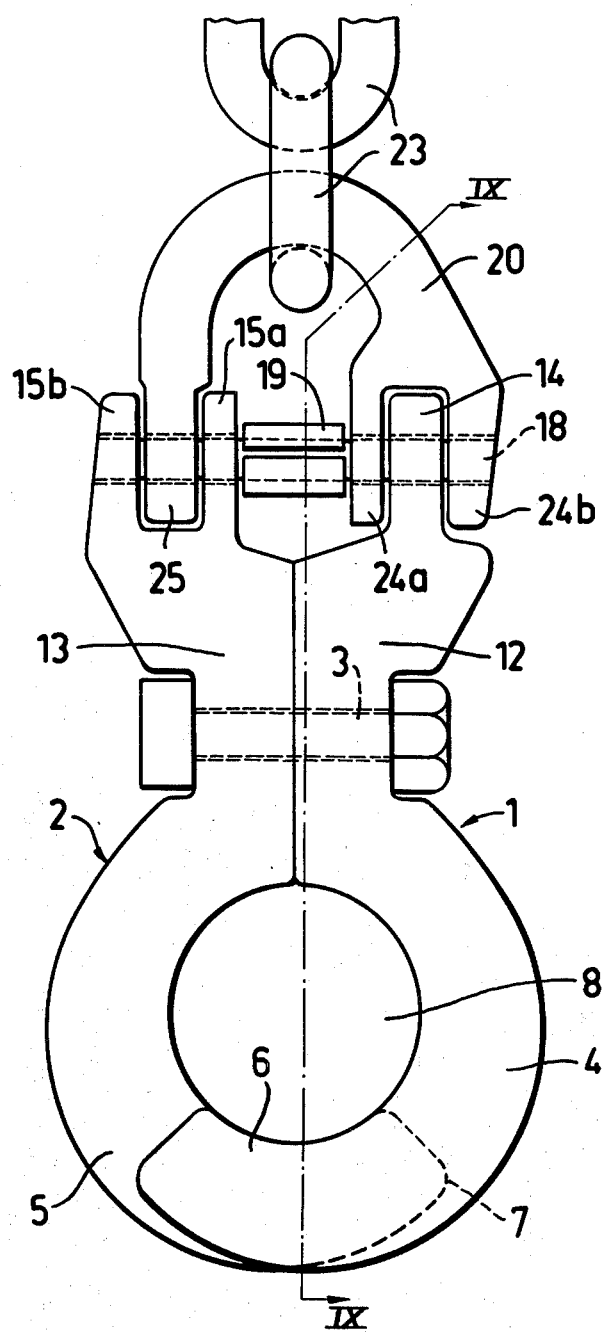
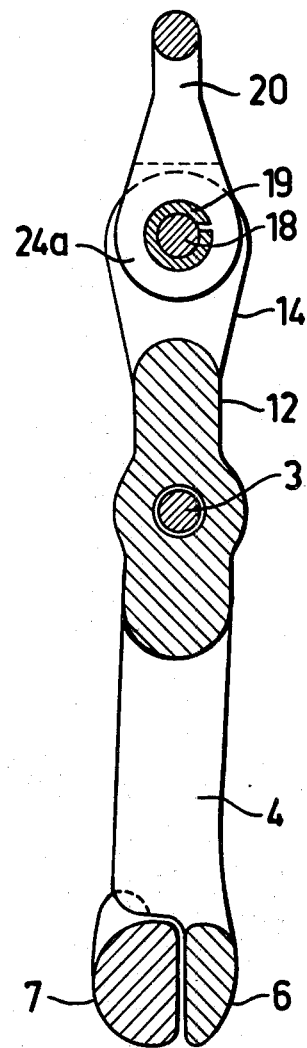

FIG.12
FIG.13
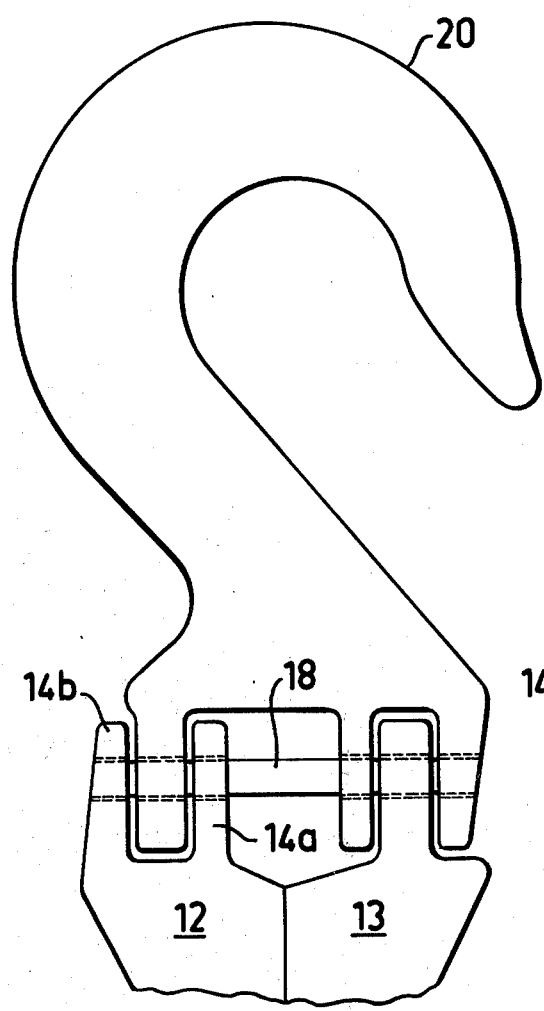
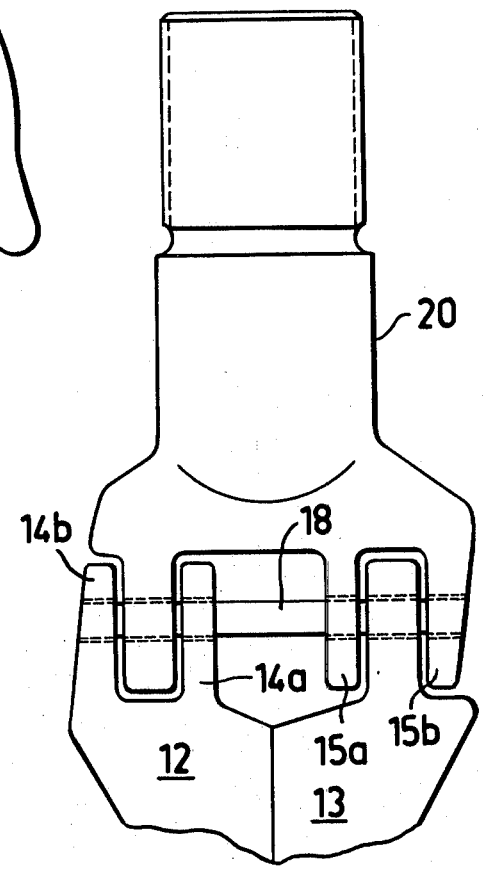

SHEARS COUPLING

This is a continuation of application Ser. No. 651,960, filed Jan. 23, 1976, now abandoned.

This invention relates to a so called shears coupling which comprises a pair of two-armed levers which are rotatably interconnected by means of a common pivot, each lever having an arcuate shank, which is located substantially in the same plane as said common pivot and has a free end, which when the shears coupling is in its closed operative position overlaps the free end of the other arcuate shank for forming a substantially closed eye.

A known shears coupling of this kind, which is disclosed in the U.S. Pat. No. 1,749,096, has the approximate shape of an 8 as seen in plan view and comprises two eyes, into each one of which a wire loop, a cable link or the like can be inserted.

The principal object of the invention is to provide a shears coupling of the kind above referred to which may selectively be coupled to any one of a plurality of coupling members of a building set, in which also the shears coupling according to the invention is comprised.

This and other objects are attained thanks to the fact that the other arm of each lever of the shears coupling according to the invention has at least one lug, which projects, preferably radially, with respect to the pivot and is provided with a through opening which substantially registers with the respective openings of the other lugs, when the shears coupling is in said closed position. A pin or bolt may be introduced through said openings for locking the levers in the closed position and for interconnecting the shears coupling with a mating coupling member having a number of similar apertured lugs which have been interlaminated with the lugs of the shears coupling in such a way that the openings of all said lugs substantially register and said pin can be passed through said openings for interconnecting the lugs of the shears coupling with those of the other coupling member.

Further features and advantages of the shears coupling according to the invention will become apparent from the following detailed description and the annexed drawings which diagramatically and as non-limiting examples illustrate some preferred embodiments of the invention.

FIG. 1 is a somewhat perspective view of a shears coupling according to the invention in shut or closed position.

FIG. 2 is an elevation corresponding to FIG. 1 and illustrating the coupling in an open position.

FIGS. 3 and 4 are plan views illustrating, partly in cross section, the two levers of the coupling as seen from that side of the respective lever which faces the other lever.

FIGS. 5 and 6 are partial sectional views, in principle on line V—V in FIGS. 3 and 4, illustrating engagement means provided in the shanks of the levers in the completely closed position and an almost completely closed position of the coupling, respectively.

FIG. 7 is a partial sectional view on line VII—VII in FIGS. 3 and 4.

FIG. 8 is a plan view of a shears coupling according to the invention, to which a chain is coupled by means of a coupling link cooperating with the shears coupling.

FIG. 9 is a longitudinal sectional view of line IX—IX in FIG. 8.

FIG. 10 illustrates diagramatically a portion of a modified embodiment of the shears coupling and an eye coupled thereto.

FIGS. 11 and 12 are partial plan views illustrating other coupling members which may be coupled to the shears coupling according to the invention.

FIG. 13 is a plan view of two interconnected shears couplings, each one of which being coupled to a link of a chain or the like.

In the drawings same or like parts or members have been designated with the same reference character, throughout.

Figure 14:
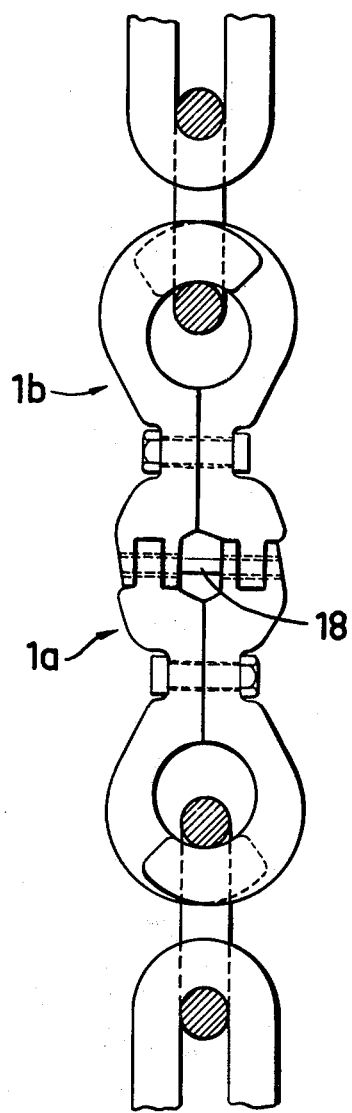
FIG. 14 is a partial plan view illustrating a modified embodiment of the shears coupling according to the invention.

The shears coupling according to the invention comprises two substantially identical levers which are generally designated 1 and 2, respectively, and a pivot pin or axis 3 which is common to the levers and by means of which they are rotatably connected to each other. The part of each lever 1, 2 which is located on one and the same side of the pivot 3 (below the axis in FIGS. 1 and 2) has the shape of an arcuate shank 4 and 5, respectively, each having a free end 6 and 7, respectively. The free ends 6, 7 of the respective shanks 4, 5 overlap each other and are in addition hereto thinned on their inside, which faces the other shank 5 and 4, respectively, and preferably also a little thickened on their respective opposite outside, as is most clearly shown in FIGS. 2, 7 and 9. When the shears coupling is closed or shut, the shanks 4, 5 will accordingly be located substantially in a common plane, in which also the pivot 3 is located, and in this position they form a closed eye 8 (FIGS. 1 and 8). To prevent the shanks or hooks 4, 5 from becoming disengaged by being bent outwards from each other on an axis perpendicular to the pivot 3, the insides of the free ends 6, 7 of the shanks 4, 5 are suitably provided with teeth or projections 10 which cooperate with and engage corresponding recesses 11 in the inside of the other shank, as shown in FIGS. 5 and 6. Each one of those lever arms 12 and 13, respectively, which are located on the opposite side of the pivot 3 with respect to the shanks 3, 4, is provided with at least one lug, which projects, preferably radially, with respect to the pivot 3. In the preferred embodiment according to FIGS. 1–4 and 8–9 the arm 12 has one lug 14, and the other arm 13 has two lugs 15a, 15b. Each of the lugs 14; 15a, 15b has a through opening 16; 17a, 17b, which are so arranged that they are mutually co-axial and preferably also parallel to the pivot 3 in the closed position of the shears coupling. A pin 18 (FIGS. 8, 9, 10) is intended to be inserted through the openings 16; 17a, 17b and to be subsequently locked in axial direction with respect to the lugs in any suitable manner, e.g. by a flexible locking sleeve 19 which surrounds the central portion of the pin 18, as shown in FIGS. 8 and 9.

As stated above, the shears coupling according to the invention is adapted to be coupled to or interconnected with any one of the members in a series of coupling elements which, like this shears coupling, are comprised in a "building set" and each has a suitable number of co-axially apertured lugs which are intended to be inserted between or straddle the lugs of the shears coupling. In FIGS. 8–9 this coupling member is an open coupling link 20 having two lugs 24a, 24b, which straddle the lug 14 of the arm 12, and one lug 25, which projects between the lugs 15a, 15b of the arm 12. The lugs 24a, 24b; 25 have openings which like the openings 16; 17a, 17b are penetrated by the pin 18.

The shears coupling according to the invention is utilized in the following way, under the presumption that it is desired to connect a cable loop (not shown) or the like to a chain 23 (FIG. 8) by the aid of the shears coupling. Initially, the cable loop is inserted between the open shanks 4, 5 of the shears coupling (FIG. 2), after which the coupling is closed. Then, the open coupling link 20 is inserted in a link comprised in the chain 23 (FIG. 8) and is subsequently brought into the position according to FIG. 8 with respect to the shears coupling, to which it is connected by inserting the pin 18 through the co-axial openings in the lugs 24a, 24b; 25 of the coupling link 20 and through the above-mentioned openings 16; 17a, 17b of the shears coupling which have been brought into registry with the first-mentioned openings. Finally the pin is locked by means of the locking sleeve 19.

It is realized that the pin 18 fulfils three functions, in that it simultaneously serves as a locking means for maintaining the levers 1, 2 in their closed position, as an interconnecting means between the shears coupling and the link 20 and as a force transferring means between the cable and the chain 23.

The number of the lugs of the arms 12, 13, is, of course, not restricted to one and two, respectively. Thus, FIG. 10 illustrates an embodiment, in which the arm 13 has two lugs 14a, 14b, too. According to FIG. 10 the lugs 14a, 15a are wider than the lugs 14b, 15b. The embodiment according to FIG. 10 has been further modified with respect to the one according to FIGS. 8-9 in that a closed coupling link has been substituted for the open link 20 and the flexible locking sleeve 19 has been replaced by a pair of split pins.

Figure 11:
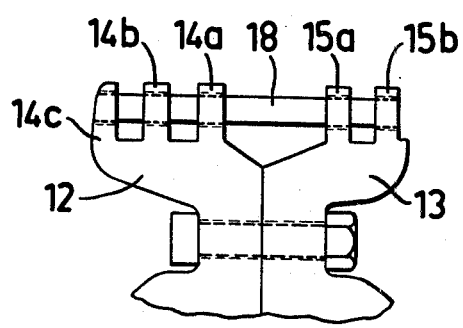

In FIG. 11 there is illustrated a further embodiment, in which the arms 12, 13 have been provided with three lugs 14a, 14b, 14c and two lugs 15a, 15b, respectively.

There are many different coupling members to which the shears coupling according to the invention can be coupled. Thus FIGS. 12 and 13 illustrate a coupling hook and a coupling stud, respectively, which are comprised in the same building set as the shears coupling 1 according to the invention.

Of course, it is also possible to connect two shears couplings 1a, 1b to each other, e.g. for interconnecting two chains as is shown in FIG. 14.

The embodiments described above and illustrated in the drawings are, of course, to be regarded merely as non-limiting examples and may, as to their details, be modified in several ways within the scope of the following claims. Thus, the pin 18 may be comprised of a bolt, which is threaded at least in part and which is held in its connecting position by means of a co-operating nut.

What I claim is:

1. Shears coupling, comprising a pair of two-armed levers, a common pivot rotatably interconnecting said levers for movement between closed and open positions, each lever having an arcuate shank with a free end, said arcuate shanks being located substantially in the same plane as said common pivot, said free ends of said shanks overlapping each other when said levers are in said closed position for forming a substantially closed eye, the other arm of each lever comprising at least one lug projecting radially from said common pivot, each lug having a through opening which when said levers are in said closed position register with each other for permitting a pin or bolt to be introduced through said openings for locking the levers in the closed position whereby to lock said eye closed.

2. Shears coupling according to claim 1, wherein each of said free shank ends are thinner than substantially the remainder of said shanks, said thinner shank ends being defined by the face of each free end overlappable with the face of the other free end being offset relative to the corresponding surface of the remainder of said shank in the direction of the opposite face of said free end, said overlappable faces including complementary interfitting ridges therein.

3. A shears coupling as defined in claim 1, further comprising:
    a second coupling member comprising an apertured lug, the aperture of said lug being in register with the through openings of said lugs on said shears coupling; and
    an elongated connector element passing through said registered lug apertures for connecting said shears coupling to said second coupling member.

4. A shears coupling as defined in claim 1, wherein said apertured lug of said second coupling member is disposed between the lugs of said shears coupling.

5. The combination according to claim 3, wherein said other coupling member comprises a closed link.

6. The combination according to claim 3, wherein said other coupling member comprises a closed eye.

7. The combination according to claim 3, wherein said other coupling member comprises an open link.

8. The combination according to claim 3, wherein said other coupling member comprises a hook.